(12) United States Patent
Jang et al.

(10) Patent No.: US 12,499,844 B2
(45) Date of Patent: Dec. 16, 2025

(54) EMISSION DRIVER AND DISPLAY DEVICE COMPRISING SAME

(71) Applicant: LG Display Co., Ltd., Seoul (KR)

(72) Inventors: Minjune Jang, Paju-si (KR); Hongjae Shin, Paju-si (KR); Miyoung Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/972,369

(22) Filed: Dec. 6, 2024

(65) Prior Publication Data

US 2025/0252929 A1   Aug. 7, 2025

(30) Foreign Application Priority Data

Feb. 7, 2024 (KR) .......................... 10-2024-0018643

(51) Int. Cl.
*G09G 3/3266* (2016.01)
*G09G 3/32* (2016.01)

(52) U.S. Cl.
CPC ............ *G09G 3/3266* (2013.01); *G09G 3/32* (2013.01); *G09G 2310/0267* (2013.01); *G09G 2310/0291* (2013.01); *G09G 2310/061* (2013.01); *G09G 2310/08* (2013.01)

(58) Field of Classification Search
CPC ................... G09G 3/3266; G09G 3/32; G09G 2310/0267; G09G 2310/0291; G09G 2310/061; G09G 2310/08
See application file for complete search history.

(56) References Cited

U.S. PATENT DOCUMENTS

| | | | |
|---|---|---|---|
| 10,089,915 B2 | 10/2018 | Kim et al. | |
| 11,482,179 B2 | 10/2022 | Kim et al. | |
| 2006/0203604 A1* | 9/2006 | Park | G09G 3/3648 365/185.23 |
| 2006/0267912 A1* | 11/2006 | Lee | G11C 19/184 345/100 |
| 2007/0183218 A1* | 8/2007 | Lee | G09G 3/3677 365/185.26 |
| 2007/0296681 A1* | 12/2007 | Kim | G11C 19/184 345/100 |

(Continued)

FOREIGN PATENT DOCUMENTS

| | | |
|---|---|---|
| KR | 10-2017-0000885 A | 1/2017 |
| KR | 10-2022-0092206 A | 7/2022 |
| KR | 10-2023-0103100 A | 7/2023 |

*Primary Examiner* — Michael J Jansen, II
(74) *Attorney, Agent, or Firm* — Fenwick & West LLP

(57) ABSTRACT

An emission driver is disclosed. The emission driver includes a Q node controller configured to control a voltage at a Q node by applying a start signal, a carry signal, or a high-potential driving voltage to the Q node responsive to a first clock signal, a QB node controller configured to control a voltage at a QB node by applying the high-potential driving voltage or a low-potential driving voltage to the QB node responsive to the first clock signal, an output buffer configured to output the high-potential driving voltage or the low-potential driving voltage to the corresponding emission line responsive to the voltages at the Q node and the QB node, and a pump controller configured to change the voltage at the Q node according to a second clock signal while the emission signal is output at a turn-on level responsive to the start signal or the carry signal.

24 Claims, 9 Drawing Sheets

(56) References Cited

U.S. PATENT DOCUMENTS

| | | | | |
|---|---|---|---|---|
| 2008/0001904 A1* | 1/2008 | Kim | ............. | G11C 19/28 |
| | | | | 345/100 |
| 2008/0068358 A1* | 3/2008 | Lee | ............. | G09G 3/3659 |
| | | | | 345/204 |
| 2008/0074379 A1* | 3/2008 | Kim | ............. | G09G 3/3677 |
| | | | | 345/94 |
| 2008/0218502 A1* | 9/2008 | Lee | ............. | G11C 19/182 |
| | | | | 345/87 |
| 2008/0303769 A1* | 12/2008 | Tobita | ............. | G11C 19/28 |
| | | | | 345/92 |
| 2009/0189677 A1* | 7/2009 | Lee | ............. | G09G 3/3677 |
| | | | | 345/204 |
| 2010/0328281 A1* | 12/2010 | Okada | ............. | G11C 19/184 |
| | | | | 345/206 |
| 2011/0157263 A1* | 6/2011 | Kim | ............. | G09G 3/3677 |
| | | | | 345/698 |
| 2015/0170592 A1* | 6/2015 | Bai | ............. | G09G 3/3677 |
| | | | | 345/100 |
| 2016/0379546 A1 | 12/2016 | Kim et al. | | |
| 2018/0137808 A1* | 5/2018 | Na | ............. | G09G 3/3233 |
| 2020/0043404 A1* | 2/2020 | Yu | ............. | G09G 3/3266 |
| 2020/0118509 A1* | 4/2020 | Noh | ............. | G11C 19/28 |
| 2021/0407356 A1* | 12/2021 | Xue | ............. | G11C 19/28 |
| 2022/0208112 A1 | 6/2022 | Kim et al. | | |
| 2023/0010792 A1* | 1/2023 | Heo | ............. | G11C 19/28 |
| 2023/0215377 A1* | 7/2023 | Han | ............. | G09G 3/3266 |
| | | | | 345/690 |
| 2024/0062703 A1* | 2/2024 | Huang | ............. | G09G 3/32 |

\* cited by examiner

EMISSION DRIVER AND DISPLAY DEVICE COMPRISING SAME

CROSS REFERENCE TO RELATED APPLICATION

The present application claims priority to Republic of Korea Patent Application No. 10-2024-0018643, filed on Feb. 7, 2024, which is hereby incorporated by reference in its entirety.

BACKGROUND

Field of Technology

The present invention relates to an emission driver and a display device including the same.

Description of the Related Art

As the information society develops, various demands for display devices for displaying images are increasing, and various types of display devices such as liquid crystal display (LCD) devices and organic light emitting diode (OLED) display devices are utilized.

A display device may include pixels disposed on a display panel, and drivers for driving the pixels. The driver may include, for example, a gate driver for controlling driving timings of the pixels, a date driver for supplying data voltages to the pixels, and an emission driver for controlling emission timings of the pixels.

When an emission signal of the emission driver for controlling the emission timings of the pixels is not normally supplied to the pixels, the pixels cannot correctly emit light and cause abnormal driving, and the quality of an image displayed on the display panel can be degraded.

SUMMARY

Embodiments are directed to providing an emission driver which is connected to a Q node to reduce a stress of a transistor to which a high gate-source voltage is applied and improve reliability, and a display including the same.

In addition, the embodiments are directed to providing an emission driver with the reduced number of transistors compared to conventional emission drivers, and a display device including the same.

In one embodiment, a display device comprises: a display panel including a plurality of pixels; and an emission driver including a plurality of stage circuits, the plurality of stage circuits configured to apply emission signals to the plurality of pixels through a plurality of emission lines, wherein each of the plurality of stage circuits includes: a Q node controller configured to control a voltage at a Q node by applying one of a start signal, a carry signal, or a high-potential driving voltage to the Q node responsive to a first clock signal received by the Q node controller; a QB node controller configured to control a voltage at a QB node by applying the high-potential driving voltage or a low-potential driving voltage that is less that the high-potential driving voltage to the QB node responsive to the first clock signal; an output buffer connected to the Q node and the QB node, the output buffer configured to output the high-potential driving voltage or the low-potential driving voltage as an emission signal of the stage circuit to a corresponding emission line from the plurality of emission lines responsive to a voltage at the Q node and a voltage of the QB node; and a pump controller connected to the Q node and receiving a second clock signal and the start signal or the carry signal, the pump controller configured to change the voltage at the Q node a plurality of times according to the second clock signal while the emission signal is output at a turn-on level that turns on one of the plurality of pixels that is connected to the corresponding emission line responsive to the start signal or the carry signal.

In one embodiment, an emission driver comprises: a plurality of stage circuits that are configured to apply emission signals to a plurality of pixels through a plurality of emission lines, wherein each of the plurality of stage circuits includes: a Q node controller configured to control a voltage at a Q node by applying one of a start signal, a carry signal, or a high-potential driving voltage to the Q node responsive to a first clock signal; a QB node controller configured to control a voltage at a QB node by applying the high-potential driving voltage or a low-potential driving voltage that is less that the high-potential driving voltage to the QB node responsive to the first clock signal, the QB node controller including a transistor that is directly connected to an input terminal of the high-potential driving voltage and receives a voltage of the Q node at a gate electrode of the transistor through a buffering transistor that is connected to the gate electrode of the transistor and the Q node; and an output buffer connected to the Q node and the QB node, the output buffer configured to output the high-potential driving voltage or the low-potential driving voltage as an emission signal of the stage circuit to a corresponding emission line from the plurality of emission lines responsive to a voltage at the Q node and a voltage at the QB node.

DETAILED DESCRIPTION

Figure 1:
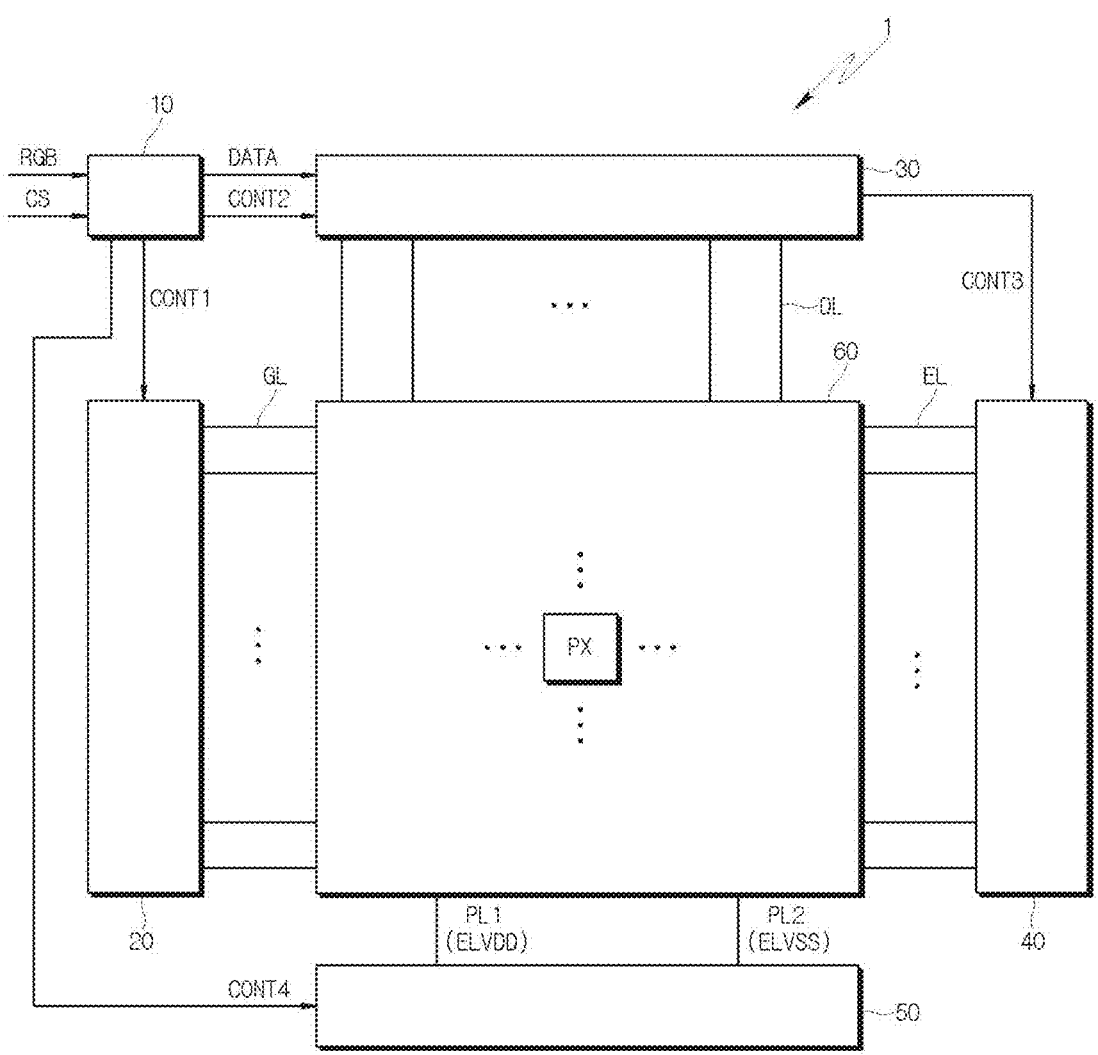
FIG. 1 is a block diagram showing a display device according to one embodiment.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/of"

includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram showing a display device according to one embodiment.

Referring to FIG. 1, a display device 1 includes a timing controller 10, a gate driver 20, a data driver 30, an emission driver 40, a power supply unit 50, and a display panel 60.

The timing controller 10 may receive image signals RGB and a control signal CS from an external host system 2 or the like. The image signals RGB may include a plurality of grayscale data. The control signal CS may include, for example, a horizontal synchronization signal, a vertical synchronization signal, and a main clock signal.

The timing controller 10 may process the image signals RGB and the control signal CS according to operating conditions of the display panel 60, and generate and output image data DATA, a gate driving control signal CONT1, a data driving control signal CONT2, an emission driving control signal CONT3, and a power supply control signal CONT4.

The gate driver 20 may generate gate signals based on a gate driving control signal CONT1 output from the timing controller 10. The gate driver 20 may provide the generated gate signals to pixels PX through a plurality of gate lines GL.

The data driver 30 may generate data signals based on the image data DATA and the data driving control signal CONT2 output from the timing controller 10. The data driver 30 may provide the generated data signals to the pixels PX through a plurality of data lines DL.

The emission driver 40 may generate emission control signals based on the emission driving control signal CONT3 output from the timing controller 10. The emission driver 40 may provide the generated emission control signals to the pixels PX through a plurality of emission lines EL.

The power supply unit 50 may generate a high potential driving voltage ELVDD and a low potential driving voltage ELVSS that are provided to the display panel 60 based on the power supply control signal CONT4. The power supply unit 50 may provide the generated driving voltages ELVDD and ELVSS to the pixels PX through the corresponding power lines PL1 and PL2, respectively.

A plurality of pixels PX (or referred to as sub-pixels) are disposed on the display panel 60. For example, the pixels PX may be arranged in a form of a matrix on the display panel 60. Pixels PX disposed in one pixel row are connected to the same gate line GL and emission line EL, and pixels PX disposed in one pixel column are connected to the same data line DL. The pixels PX may emit light with brightness corresponding to the gate signal and the data signal supplied through the gate lines GL and the data lines DL in response to the emission control signal applied through the emission line EL.

In one embodiment, each pixel PX may display one of red, green, and blue. In another embodiment, each pixel PX may display one of cyan, magenta, and yellow. In various embodiments, each pixel PX may display one of red, green, blue, and white.

The timing controller 10, the gate driver 20, the data driver 30, the emission driver 40, and the power supply unit 50 may each be configured as a separate integrated circuit (IC) or at least a partially integrated IC. In addition, at least one of the gate driver 20 and the emission driver 40 may be configured in a form of a gate in panel formed integrally with the display panel 60.

Figure 2:
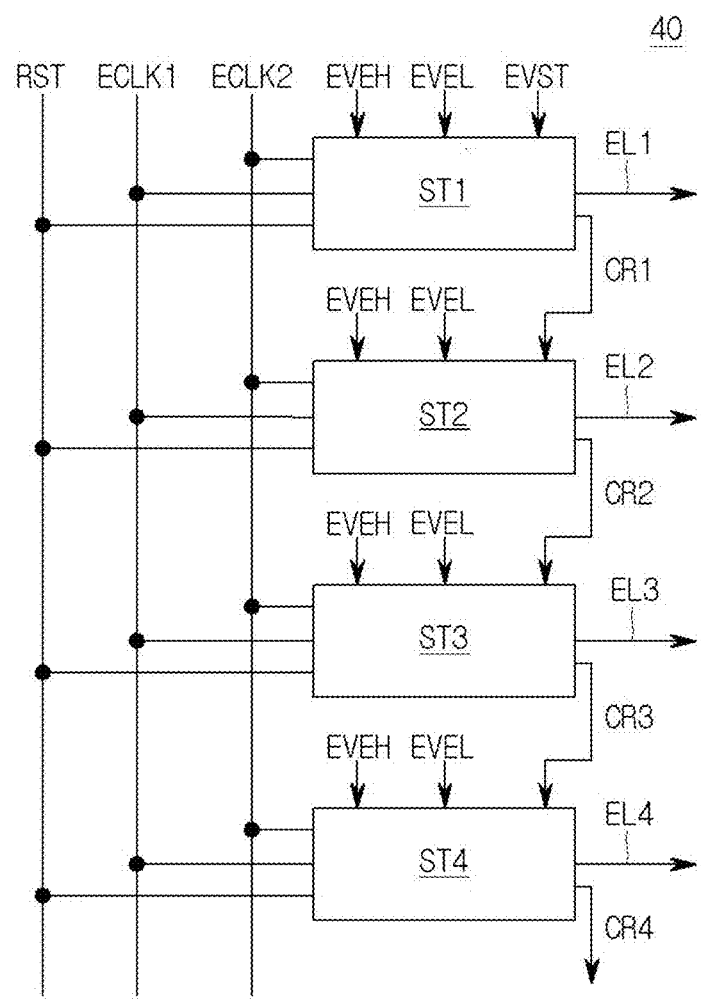
FIG. 2 is a view schematically showing a configuration of an emission driver according to one embodiment.

FIG. 2 is a view schematically showing a configuration of an emission driver according to one embodiment.

Referring to FIG. 2, the emission driver 40 may include a plurality of stage circuits ST1 to ST4. For convenience of description, FIG. 2 shows the four stage circuits ST1 to ST4 included in the emission driver 40, but any number of stage circuits may be included in the emission driver 40.

The second stage circuit ST2 may be dependently connected to the first stage circuit ST1, the third stage circuit ST3 may be dependently connected to the second stage circuit ST2, and the fourth stage circuit ST4 may be dependently connected to the third stage circuit ST3. The first to fourth stage circuits ST1 to ST4 may have substantially the same configuration.

The stage circuits ST1 to ST4 may be respectively connected to the corresponding emission lines EL1 to EL4 to output a high-potential driving voltage EVEH or a low-potential driving voltage EVEL that is less than the high-potential driving voltage EVEH to the emission lines EL1 to EL4 as emission signals in response to emission clock signals ECLK1 and ECLK2.

The first stage circuit ST1 may receive a start signal EVST. In addition, the second to fourth stage circuits ST2 to ST4 may respectively receive carry signals CR1 to CR3 output from the previous stage circuits ST1 to ST3. For example, the second stage circuit ST2 may receive the first carry signal CR1 output from the first stage circuit ST1, the third stage circuit ST3 may receive the second carry signal CR2 output from the second stage circuit ST2, and the fourth stage circuit ST4 may receive the third carry signal CR3 output from the third stage circuit ST3. Each of the stage circuits ST1 to ST4 is pulled up by the start signal EVST or the carry signals CR1 to CR3 at a gate-on level to be in a state capable of outputting emission signals.

The emission driver 40 according to one embodiment may be configured to operate in a forward mode and backward mode. In the forward mode, the emission driver 40 may sequentially drive the dependently connected stage circuits ST1 to ST4 from the first stage circuit ST1 to the last stage circuit. In the backward mode, the emission driver 40 may sequentially drive the dependently connected stage circuits ST1 to ST4 from the last stage circuit to the first stage circuit ST1. In the backward mode, the start signal EVST may be applied to the last stage circuit, and the stage circuits ST1 to ST4 may be configured to receive the carry signals CR2 to CR4 from the next stages ST2 to ST4.

The clock signals ECLK1 and ECLK2 may be square wave signals in which a gate-on voltage and a gate-off voltage alternate every 1 horizontal period (1H). The first clock signal ECLK1 and the second clock signal ECLK2 may have the same waveform and may be pulse signals whose phases are shifted by a predetermined interval. For example, the second clock signal ECLK2 may have the same waveform as the first clock signal ECLK1 and may be a pulse signal whose phase is shifted by a half cycle with respect to the first clock signal ECLK1, that is, with a phase opposite to the first clock signal ECLK1. In the shown embodiment, each of the stage circuits ST1 to ST4 is configured to receive two clock signals ECLK1 and ECLK2, but is not limited thereto, and a larger or fewer number of clock signals may be provided.

Driving voltages EVEH and EVEL necessary for driving the stage circuits ST1 to ST4 may be applied to the stage circuits ST1 to ST4. For example, the high-potential driving voltage EVEH, which is a first level voltage, and the low-potential driving voltage EVEL, which is a second level voltage that is less than the first level voltage, may be applied to the stage circuits ST1 to ST4. In various embodiments, the stage circuits ST1 to ST4 may be configured to receive one or more high-potential driving voltages EVEH having different levels and/or one or more low-potential driving voltages EVEL having different levels.

The high-potential driving voltage EVEH and the low-potential driving voltage EVEL may have DC voltage levels. The high-potential driving voltage EVEH is a voltage for turning on transistors provided in the pixel PX (see FIG. 1), and the low-potential driving voltage EVEL is a voltage for turning off the transistors provided in the pixel PX, and in one embodiment, the voltage level of the high-potential driving voltage EVEH may be set higher than the voltage level of the low-potential driving voltage EVEL. In other words, the first level voltage may be greater than the second level voltage. In addition, the second level voltage may have, for example, a level equal to or similar to a ground voltage.

When the types of transistors provided in the pixel PX and transistors provided in the stage circuits ST1 to ST4 are the same, the transistors of the stage circuits ST1 to ST4 may be turned on according to the high-potential driving voltage EVEH, and the transistors of the stage circuits ST1 to ST4 may be turned off according to the low-potential driving voltage EVEL. Conversely, when the types of transistors provided in the pixel PX and transistors provided in the stage circuits ST1 to ST4 are not the same, the transistors in the stage circuits ST1 to ST4 may be turned off according to the high-potential driving voltage EVEH, and the transistors of the stage circuits ST1 to ST4 may be turned on according to the low-potential driving voltage EVEL. Therefore, a predetermined transistor is not necessarily turned on by the high-potential driving voltage EVEH, and a predetermined transistor is not necessarily turned off by the low-potential driving voltage EVEL. In other words, the predetermined transistor may be turned off in response to the high-potential driving voltage EVEH, and the predetermined transistor may be turned on in response to the low-potential driving voltage EVEL. Hereinafter, for convenience of description, it is assumed that the high-potential driving voltage EVEH, that is, the high level voltage is a turn-on level voltage, and the low-potential driving voltage EVEL, that is, the low level voltage is a turn-off level voltage.

The stage circuits ST1 to ST4 are configured to further receive a reset signal RST. The stage circuits ST1 to ST4 may be initialized by being pulled down in response to the reset signal RST.

The stage circuits ST1 to ST4 may output emission signals. Emission signals output from the stage circuits ST1 to ST4 may be provided to the corresponding emission lines EL1 to EL4, respectively.

The stage circuits ST1 to ST4 may further output the carry signals CR1 to CR4. The carry signals CR1 to CR4 output from the stage circuits ST1 to ST4 may be provided to the next stage circuits ST2 to ST4, respectively. For example, the first carry signal CR1 output from the first stage circuit ST1 may be provided to the second stage circuit ST2, the second carry signal CR2 output from the second stage circuit ST2 may be provided to the third stage circuit ST3, the third carry signal CR3 output from the third stage circuit ST3 may be provided to the fourth stage circuit ST4, and the fourth carry signal CR4 output from the fourth stage circuit ST4 may be provided to a fifth stage circuit (not shown).

The stage circuits ST1 to ST4 included in the emission driver 40 may have substantially the same configuration excluding the type of receiving signal. For example, the first stage circuit ST1, which is the first stage circuit for receiving a start signal EVST, and the remaining stage circuits (e.g., the second to fourth stage circuits ST2 to ST4) for receiving the carry signals CR1 to CR4 of the previous stage circuit may have substantially the same circuit configuration excluding the receiving input signal (i.e., the start signal EVST or the carry signal CR1 to CR4 of the previous stage circuit) and may be operated in substantially the same manner.

Figure 3:
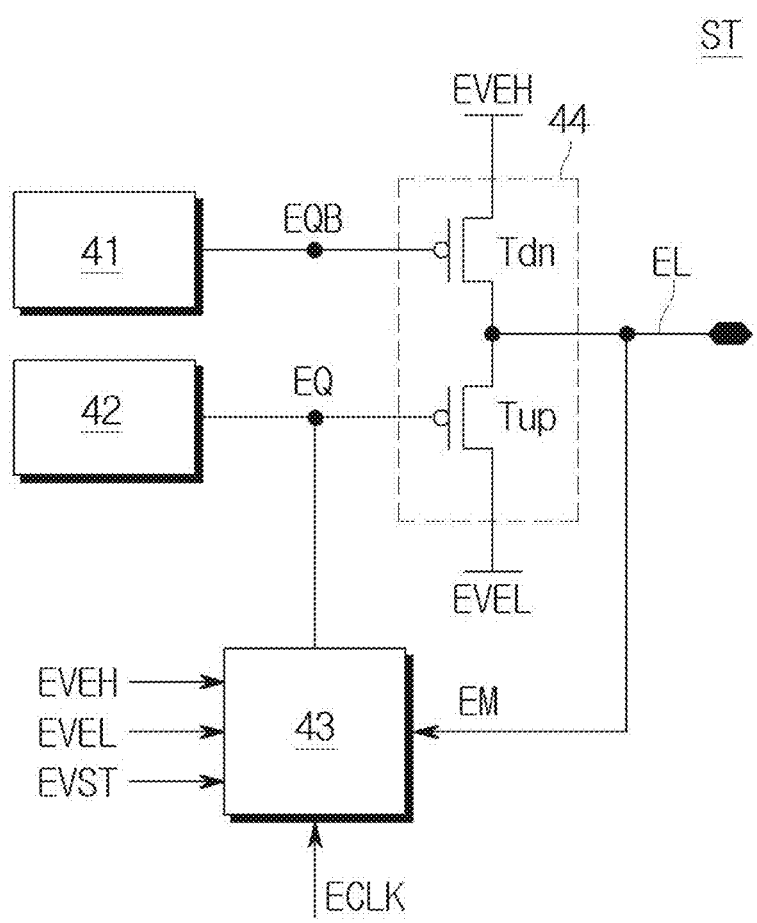
FIG. 3 is a view schematically showing a stage circuit of FIG. 2 according to one embodiment.

FIG. 3 is a view schematically showing a stage circuit of FIG. 2 according to one embodiment.

Referring to FIG. 3, the stage circuit ST may include a Q node controller 42, a QB node controller 41, a pump controller 43, and an output buffer 44.

The output buffer 44 may include at least one pull-up transistor Tup and at least one pull-down transistor Tdn. The pull-up transistor Tup may be electrically connected between the low-potential driving voltage EVEL and an output terminal of the emission signal. The pull-up transistor Tup may be turned on according to a voltage at the Q node EQ to output the low-potential driving voltage EVEL as an emission signal to the emission line EL.

The pull-down transistor Tdn may be electrically connected between the high-potential driving voltage EVEH and the output terminal of the emission signal. The pull-down transistor Tdn may be turned on according to a voltage of a QB node EQB to output the high-potential driving voltage EVEH signal to the emission line EL as an emission signal.

The Q node controller 41 may control the voltage at the QB node EQB. The QB node controller 42 may control the voltage at the Q node EQ.

The pump controller 43 (e.g., a circuit) may be electrically connected to the Q node EQ. The pump controller 43 may be configured to receive the start signal EVST, the clock signal ECLK, the high-potential driving voltage EVEH and the low-potential driving voltage EVEL. In addition, the pump controller 43 may be configured to receive the emission signal EM output from the output buffer 44 through the emission line EL.

The pump controller 43 may be controlled according to the voltage level of the emission signal EM and the input signals to adjust the voltage level of the Q node EQ. For example, the pump controller 43 may control the voltage at the Q node EQ to maintain the level for turning on the pull-up transistor Tup during a period when the emission signal at the turn-on level is output. Since the voltage level of the Q node EQ is stably maintained through the pump controller 43, the emission signal at the turn-on level may be stably supplied even when the emission period is long.

Figure 4:
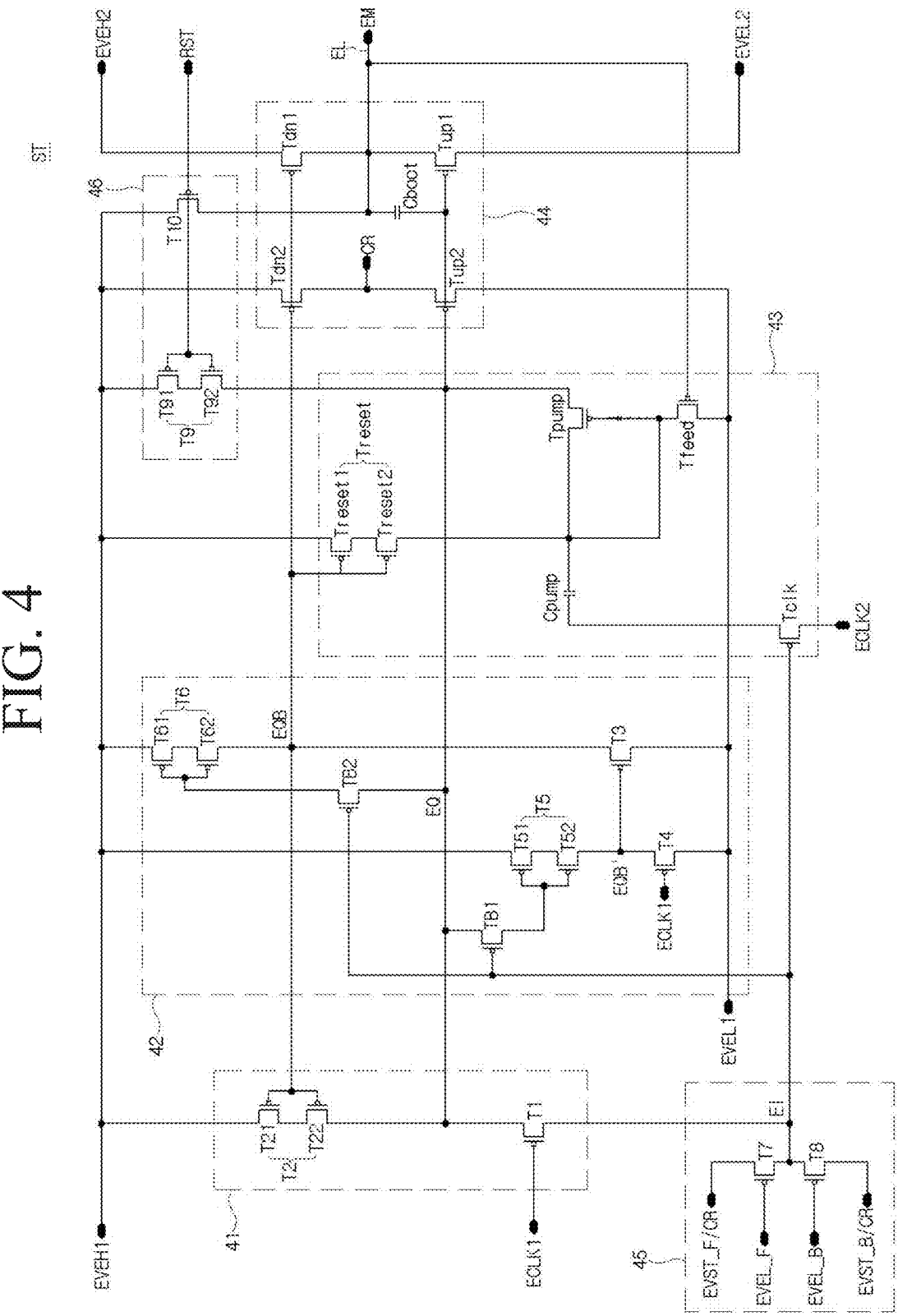
FIG. 4 is a circuit diagram specifically showing the stage circuit of FIG. 3 according to one embodiment.

FIG. 4 is a circuit diagram of the stage circuit of FIG. 3 according to one embodiment.

Referring to FIG. 4, the stage circuit ST may include the Q node controller 41, the QB node controller 42, the pump controller 43, and the output buffer 44. In addition, the stage circuit ST may further include a signal input unit 45 and a reset unit 46.

The Q node controller 41 is configured to control the voltage at the Q node EQ by applying the start signal EVST, the carry signal CR, or the first high-potential driving voltage EVEH1 to the Q node EQ in response to the first clock signal ECKL1. To this end, the Q node controller 41 may include a first transistor T1 and a second transistor T2.

The first transistor T1 may be electrically connected between an input node EI of the start signal EVST or the carry signal CR output from the previous stage and the Q node EQ. For example, the source electrode of the first transistor T1 is connected to the Q node EQ and the drain electrode is connected to the start signal EVST or the carry signal CR output from the previous stage and the Q node EQ. A gate electrode of the first transistor T1 is configured to receive the first clock signal ECLK1. The first transistor T1 may be turned on according to the first clock signal ECLK1 to apply the start signal EVST or the carry signal CR input through the signal input unit 45 to the Q node EQ.

The second transistor T2 may be electrically connected between an input terminal of the first high-potential driving voltage EVEH1, the Q node EQ, and the source electrode of the first transistor T1. The gate electrode of the second transistor T2 is connected to the QB node EQB. The second transistor T2 may be turned on when a voltage at the QB node EQB is set to the turn-on level, and the first high-potential driving voltage EVEH1 may be applied to the Q node EQ. When the QB node EQB is set to the turn-on level voltage through the second transistor T2, the Q node EQ may be set to the turn-off level voltage through the second transistor T2.

The QB node controller 42 is configured to control the voltage at the QB node EQB by applying the first high-potential driving voltage EVEH1 or the first low-potential driving voltage EVEL1 to the QB node EQB in response to the first clock signal ECLK1. To this end, the QB node controller 42 may include a third transistor T3, a fourth transistor T4, a fifth transistor T5, and a sixth transistor T6. In addition, the QB node controller 42 may further include a first buffering transistor TB1 and a second buffering transistor TB2.

The third transistor T3 may be electrically connected between an input terminal of the first low-potential driving voltage EVEL1 and the QB node EQB. For example, the source electrode of the third transistor T3 is connected to the QB node EQB and the drain electrode of the third transistor T3 is connected to the input terminal of the first low-potential driving voltage EVEL1. The gate electrode of the third transistor T3 is connected to a QB' node EQB'. The third transistor T3 may be turned on when a voltage at the QB' node EQB' is set to the turn-on level to apply the first low-potential driving voltage EVEL1 to the QB node EQB.

The fourth transistor T4 may be electrically connected between the input terminal of the first low-potential driving voltage EVEL1 and the QB' node EQB'. For example, the source electrode of the fourth transistor T4 is connected to the QB' node EQB' and the gate electrode of the third driving transistor T3 and the drain electrode of the fourth transistor T4 is connected to the input terminal of the first low-potential driving voltage EVEL1. A gate electrode of the fourth transistor T4 is configured to receive the first clock signal ECLK1. The fourth transistor T4 may be turned on according to the first clock signal ECLK1 to apply the first low-potential driving voltage EVEL1 to the QB' node EQB'. When the fourth transistor T4 is turned on and the voltage at the QB' node EQB' is set to the first low-potential driving voltage EVEL1, the third transistor T3 is turned on and the voltage at the QB' node EQB' is set to the first low-potential driving voltage EVEL1.

The fifth transistor T5 may be electrically connected between the QB' node EQB' and the input terminal of the first high-potential driving voltage EVEH1. For example, the source electrode of the fifth transistor T5 is connected to the input terminal of the first high-potential driving voltage EVEH1 and the drain electrode of the fifth transistor T5 is connected to the QB' node EQB' and the gate electrode of the third transistor T3. A gate electrode of the fifth transistor T5 may be configured to receive the voltage at the Q node EQ. The fifth transistor T5 may be turned on when the voltage at the Q node EQ is set to the turn-on level to apply the first high-potential driving voltage EVEH1 to the QB' node EQB'. When the fifth transistor T5 is turned on and the voltage at the QB' node EQB' is set to the first low-potential driving voltage EVEL1, the third transistor T3 is turned off not to apply the first low-potential driving voltage EVEL1 to the QB node EQB.

In one embodiment, the gate electrode of the fifth transistor T5 may be electrically connected to the Q node EQ through the first buffering transistor TB1. The first buffering transistor TB1 may be electrically connected between the gate electrode of the fifth transistor T5 and the Q node EQ. For example, a source electrode of the first buffering transistor TB1 is connected to the Q node EQ and the drain electrode of the first buffering transistor TB1 is connected to the gate electrode of the fifth transistor T5. A gate electrode of the first buffering transistor TB1 is configured to receive the start signal EVST or the carry signal CR. The first buffering transistor TB1 is turned on according to the start signal EVST or the carry signal CR to transmit the voltage at the Q node EQ to the gate electrode of the fifth transistor T5.

The high-potential driving voltages EVEH1 and EVEL2 applied to the stage circuit ST have a high voltage level of about 25 V or more. When the first high-potential driving voltage EVEH1 is applied to the Q node EQ so that the stage circuit ST becomes a pull-up state, a high gate-source voltage of the fifth transistor T5 of which gate electrode is connected to the Q node EQ increases rapidly. This increases an element stress of the fifth transistor T5, thereby shortening a lifetime. In the shown embodiment, the gate electrode of the fifth transistor T5 is indirectly connected to the Q node EQ through the first buffering transistor TB1 rather than directly connected to the Q node EQ. The first buffering transistor TB1 functions as a resistance between the Q node EQ and the gate electrode of the fifth transistor T5, thereby preventing a high-potential voltage from being suddenly transmitted to the gate electrode of the fifth transistor T5. Therefore, it is possible to reduce the stress applied to the fifth transistor T5 through the first buffering transistor TB1 and increase the lifetime of the element, thereby improving the stability and reliability of the stage circuit ST.

Meanwhile, the turn-on and turn-off of the first buffering transistor TB1 are controlled by the start signal EVST or the carry signal CR. The start signal EVST and the carry signal CR are alternating current (AC) signals as pulse signals of which turn-on and turn-off levels alternate rather than constant direct current (DC) voltages. Therefore, the first buffering transistor TB1 cannot maintain the turn-on state for a long time, and as a result, it is possible to reduce the stress applied to the first buffering transistor TB1, thereby further increasing the lifetime and further improving the stability of the stage circuit ST.

The sixth transistor T6 may be electrically connected between the input terminal of the first high-potential driving voltage EVEH1 and the QB node EQB. For example, the source electrode of the sixth transistor T6 is connected to the input terminal of the first high-potential driving voltage EVEH1 and the drain electrode of the sixth transistor T6 is connected to the QB node EQB. A gate electrode of the sixth transistor T6 may be configured to receive the voltage at the Q node EQ. The sixth transistor T6 may be turned on when the voltage at the Q node EQ is set to the turn-on level to apply the first high-potential driving voltage EVEH1 to the QB node EQB. When the QB node EQ is set to the turn-on level voltage, the QB node EQB may be set to the turn-off level voltage through the sixth transistor T6.

As described with reference to the fifth transistor T5, the gate electrode of the sixth transistor T6 may be electrically connected to the Q node EQ through the second buffering transistor TB2. The second buffering transistor TB2 may be electrically connected between the gate electrode of the sixth transistor T6 and the Q node EQ. For example, the source electrode of the second buffering transistor TB2 is connected to the gate electrode of the sixth transistor T6 and the drain electrode of the second buffering transistor TB2 is connected to the Q node EQ. A gate electrode of the second buffering transistor TB2 is configured to receive the start signal EVST or the carry signal CR. The second buffering transistor TB2 is turned on according to the start signal EVST or the carry signal CR to transmit the voltage at the Q node EQ to the gate electrode of the sixth transistor T6. Since the functions and effects of the second buffering transistor TB2 are the same as those described for the first buffering transistor TB1, detailed descriptions thereof will be omitted.

While the emission signal EM is output at the turn-on level, the pump controller 43 is configured to change the voltage at the Q node EQ according to the second clock signal ECLK2 in response to the start signal EVST or the carry signal CR. To this end, the pump controller 43 may include a clock transistor Tclk, a pump capacitor Cpump, a feedback transistor Tfeed, a pump transistor Tpump, and a reset transistor Treset.

The clock transistor Tclk may be electrically connected between the pump capacitor Cpump and the input terminal of the second clock signal ECLK2. For example, a source electrode of the clock transistor Tclk is connected between the pump capacitor Cpump and the drain electrode of the clock transistor Tclk is connected to the input terminal of the first clock signal ECLK1. A gate electrode of the clock transistor Tclk is configured to receive the start signal EVST or the carry signal CR. The clock transistor Tclk may be turned on according to the start signal EVST or the carry signal CR to apply a voltage corresponding to the second clock signal ECLK2 to the pump capacitor Cpump.

The pump capacitor Cpump may be electrically connected between the clock transistor Tclk and the pump transistor Tpump. For example, a first capacitor electrode of the pump capacitor Cpump is connected to the source electrode of the clock transistor Tclk and a second capacitor electrode of the pump capacitor Cpump is connected to the source electrode of the pump transistor Tpump. The pump capacitor Cpump may store the voltage applied through the clock transistor Tclk.

The feedback transistor Tfeed may be electrically connected between the first low-potential driving voltage EVEL1 and a gate electrode of the pump transistor Tpump. For example, the source electrode of the feedback transistor Tfeed is connected to gate electrode of the pump transistor Tpump and a drain electrode of the feedback transistor Tfeed is connected to the first low-potential driving voltage EVEL1. A gate electrode of the feedback transistor Tfeed is connected to the emission line EL. The feedback transistor Tfeed is turned on while the emission signal EM at the turn-on level is output to the emission line EL to apply the first low-potential driving voltage EVEL1 to the gate electrode of the pump transistor Tpump. Therefore, when the feedback transistor Tfeed is turned on, the pump transistor Tpump may be turned on in response to the first low-potential driving voltage EVEL1.

The pump transistor Tpump is diode-connected between the pump capacitor Cpump and the Q node EQ. The gate electrode of the pump transistor Tpump is connected to the feedback transistor Tfeed. The pump transistor Tpump is turned on when the first low-potential driving voltage EVEL1 is applied to the gate electrode through the feedback transistor Tfeed to electrically connect the pump capacitor Cpump with the Q node EQ.

The reset transistor Treset may be electrically connected between the input terminal of the first high-potential driving voltage EVEH1 and the pump capacitor Cpump. For example, a source electrode of the reset transistor Treset is connected to the input terminal of the first high-potential driving voltage EVEH1 and the drain electrode of the reset transistor Treset is connected to the pump capacitor Cpump. In addition, the drain electrode of the reset transistor Treset may be electrically connected to the gate electrode of the pump transistor Tpump. A gate electrode of the reset transistor Treset is connected to the QB node EQB. The reset transistor Treset may be turned on according to the voltage at the QB node EQB to apply the first high-potential driving voltage EVEH1 to the gate electrode of the pump transistor Tpump, thereby turning the pump transistor Tpump off.

The output buffer 44 is configured to output the high-potential driving voltages EVEH1 and EVEH2 or the low-potential driving voltages EVEL1 and EVEL2 to the corresponding emitting line EL in response to the voltages at the Q node EQ and the QB node EQB. To this end, the output buffer 44 may include one or more pull-up transistors Tup1 and Tup2 and one or more pull-down transistors Tdn1 and Tdn2. For example, the output buffer 44 may include a pair of pull-up and pull-down transistors Tup1 and Tdn1 for outputting the emission signal EM and a pair of pull-up and pull-down transistors Tup2 and Tdn2 for outputting the carry signal CR.

The first pull-up transistor Tup1 may be electrically connected between the second low-potential driving voltage EVEL2 and the emission line EL. A gate electrode of the first pull-up transistor Tup1 is connected to the Q node EQ. When the voltage at the Q node EQ is set to the turn-on level, the first pull-up transistor Tup1 may output the second low-potential driving voltage EVEL2 as the emission signal EM to the emission line EL.

In one embodiment, a boot capacitor Cboot may be connected between the emission line EL and the gate electrode of the first pull-up transistor Tup1. The boot capacitor Cboot may boost a voltage of the gate electrode of the first pull-up transistor Tup1 to a lower level when the emission signal EM at the turn-on level is output to the emission line EL, thereby stably maintaining the turn-on state of the first pull-up transistor Tup1.

The first pull-down transistor Tdn1 may be electrically connected between the second high-potential driving voltage EVEH2 and the emission line EL. A gate electrode of the first pull-down transistor Tdn1 is connected to the QB node EQB. When the voltage at the QB node EQB is set to the turn-on level, the first pull-down transistor Tdn1 may output the second high-potential driving voltage EVEH2 as the emission signal EM to the emission line EL.

The second pull-up transistor Tup2 may be electrically connected between the first low-potential driving voltage EVEL1 and an output terminal of the carry signal CR. A gate electrode of the second pull-up transistor Tup2 is connected to the Q node EQ. When the voltage at the Q node EQ is set to the turn-on level, the second pull-up transistor Tup2 may output the first low-potential driving voltage EVEL1 as the carry signal CR.

The second pull-down transistor Tdn2 may be electrically connected between the first high-potential driving voltage EVEH1 and the output terminal of the carry signal CR. The gate electrode of the second pull-down transistor Tdn2 is connected to the QB node EQB. When the voltage at the QB node EQB is set to the turn-on level, the second pull-down transistor Tdn2 may output the first high-potential driving voltage EVEH1 as the carry signal CR.

As described above, the emission driver 40 (see FIG. 2) according to one embodiment may be configured to operate in a forward mode and backward mode. In the embodiment, the stage circuit ST is configured to receive a forward start signal EVST_F or a carry signal CR_F output from the previous stage circuit ST through the signal input unit 45 or receive a backward start signal EVST_B or a carry signal CR_B output from the next stage circuit ST. The signal input unit 45 may include a seventh transistor T7 and an eighth transistor T8.

One electrode of the seventh transistor T7 is connected to an input terminal of the forward start signal EVST_F or an input terminal of the carry signal CR of the previous stage circuit ST. The other electrode of the seventh transistor T7 is connected to the input node EI. A gate electrode of the seventh transistor T7 may be connected to a forward low-potential driving voltage EVEL_F. The seventh transistor T7 may be turned on by the forward low-potential driving voltage EVEL_F applied when the emission driver 40 is in the forward mode to apply the forward start signal EVST_F to the input node EL1.

One electrode of the eighth transistor T8 is connected to an input terminal of the backward start signal EVST_B or an input terminal of the carry signal CR of the next stage circuit ST, and the other electrode is connected to the input node EI. A gate electrode of the eighth transistor T8 may be connected to a backward low-potential driving voltage EVEL_B. The eighth transistor T8 may be turned on by the backward low-potential driving voltage EVEL_B applied when the emission driver 40 is in the backward mode to apply the backward start signal EVST_B to the input node EL1.

The stage circuit ST may further include the reset unit 46. The reset unit 46 may include a ninth transistor T9 and a tenth transistor T10.

The ninth transistor T9 may be electrically connected between the input terminal of the first high-potential driving voltage EVEH1 and the Q node EQ. For example, the source electrode of the ninth transistor T9 is connected to the input terminal of the first high-potential driving voltage EVEH1 and the drain electrode of the ninth transistor T9 is connected to the Q node EQ. A gate electrode of the ninth transistor T9 is configured to receive the reset signal RST.

The ninth transistor T9 may be turned on according to the reset signal RST to reset the Q node EQ to the first high-potential driving voltage EVEH1.

The tenth transistor T10 may be electrically connected between the input terminal of the first high-potential driving voltage EVEH1 and the emission line EL. For example, the source electrode of the tenth transistor T10 is connected to the input terminal of the first high-potential driving voltage EVEH1 and the drain electrode of the tenth transistor T10 is connected to the emission line EL A gate electrode of the tenth transistor T10 is configured to receive the reset signal RST. The tenth transistor T10 may be turned on according to the reset signal RST to output the first high-potential driving voltage EVEH1 at the turn-off level to the emission line EL.

When the ninth transistor T9 and the tenth transistor T10 are turned on in response to the reset signal RST, the Q node EQ may be reset to a high-potential voltage, the QB node EQB may be reset to a low-potential voltage, and the emission signal EM at the turn-off level may be output to the emission line EL.

In one embodiment, in the stage circuit ST, at least one of the transistors directly connected to the first high-potential driving voltage EVEH1 may be formed of two sub-transistors connected in series. For example, the second transistor T2 may be formed of two sub-second transistors T21 and T22 connected in series (e.g., serially connected), and the fifth transistor T5 may be formed of two sub-fifth transistors T51 and T52 connected in series. As shown in FIG. 4, the gate electrodes of the two sub-second transistors T21 and T22 are connected to each other and the gate electrodes of the sub-fifth transistors T51 and T52 are connected to each other. In addition, the sixth transistor T6 may be formed of two sub-sixth transistors T61 and T62 connected in series, the ninth transistor T9 may be formed of two sub-ninth transistors T91 and T92 connected in series, and the reset transistor Treset may be formed of two sub-reset transistors Treset1 and Treset2 connected in series. Similar to the second and fifth transistors, the gate electrodes of the two sub-sixth transistors T61 and T62 are connected to each other, gate electrodes of the two sub-ninth transistors T91 and T92 are connected to each other, and gate electrodes of the two sub-reset transistors Treset1 and Treset2 are connected to each other.

Therefore, by distributing the stress applied during operation to the plurality of sub-transistors, it is possible to reduce the stress applied to each transistor and improve the stability and reliability of the operation.

In the shown embodiment, the stage circuit ST is configured to receive two high-potential driving voltages EVEH1 and EVEH2 and two low-potential driving voltages EVEL1 and EVEL2. However, the present embodiment is not limited thereto, and a fewer or larger number of high-potential driving voltages and/or low-potential driving voltages may be applied to the stage circuit ST. For example, the first high-potential driving voltage EVEH1 and the second high-potential driving voltage EVEH2 may be voltages at the same level or different levels, and the first low-potential driving voltage EVEL1 and the second low-potential driving voltage EVEL2 may be voltages at the same level or different levels. In addition, depending on the type of transistor (e.g., N type or P type) constituting the stage circuit ST and/or the pixel PX (see FIG. 1), the high-potential driving voltages EVEH1 and EVEH2 and the low-potential driving voltages EVEL1 and EVEL2 may be applied reversely.

Figure 5:
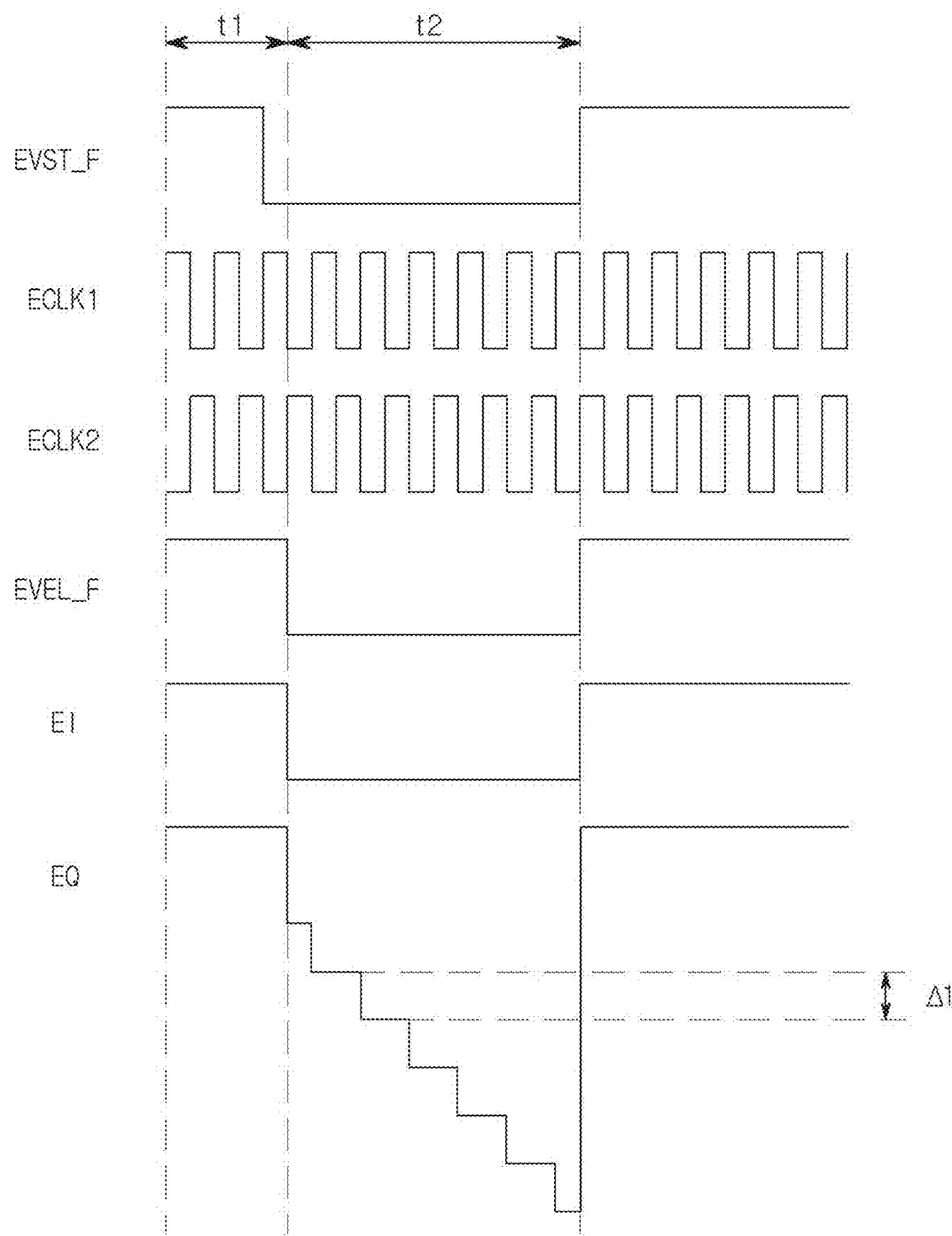
FIG. 5 is a timing diagram showing a method of driving the stage circuit of FIG. 4 according to one embodiment.

FIG. 5 is a timing diagram showing a method of driving the stage circuit of FIG. 4 according to one embodiment. In FIG. 5, it is assumed that the emission driver 40 (see FIG. 2) is driven in the forward mode.

Referring to FIGS. 4 and 5 together, the forward start signal EVST_F may be applied at the turn-off level (i.e., high level) for a first period t1 in one frame. In addition, while the forward start signal EVST_F at the turn-off level is applied, the first clock signal ECLK1 may be applied at the turn-on level (i.e., low level).

When the first transistor T1 is turned on in response to the first clock signal ECLK1, the forward start signal EVST_F may be transmitted to the Q node EQ, and the voltage at the Q node EQ may be set to a high level.

In addition, when the fourth transistor T4 is turned on in response to the first clock signal ECLK1, the first low-potential driving voltage EVEL1 may be applied to the gate electrode of the third transistor T3 to turn the third transistor T3 on. Then, the first low-potential driving voltage EVEL1 may be transmitted to the QB node EQB through the third transistor T3, and the voltage at the QB node EQB may be set to a low level. The first pull-down transistor Tdn1 and the second pull-down transistor Tdn2 may be turned on in response to the voltage at the QB node EQB at the low level, and the second high-potential driving voltage EVEH2 and the first high-potential driving voltage EVEH1 may be output to the emission signal EM and the carry signal CR, respectively.

While the voltage at the QB node EQB is set to the low level, the first high-potential driving voltage EVEH1 may be applied to the Q node EQ through the second transistor T2 turned on in response thereto, thereby stably maintaining the voltage at the Q node EQ at the high level.

In addition, while the voltage at the QB node EQB is set to the low level, the first high-potential driving voltage EVEH1 is applied to the gate electrode of the pump transistor Tpump through the reset transistor Treset turned on in response thereto to turn off the pump transistor Tpump. In other words, the pump controller 43 may be separated from the Q node EQ. In other words, while the emission signal EM at the turn-off level is output, the pump controller 43 does not operate.

Thereafter, the forward start signal EVST_F may be applied at the turn-on level (i.e., low level). When the forward low-potential driving voltage EVEL_F is applied to the gate electrode of the seventh transistor T7 for a second period t2, the seventh transistor T7 may be turned on to apply the forward start signal EVST_F to the Q node controller 41, the QB node controller 42, and the pump controller 43.

Therefore, the first buffering transistor TB1 and the second buffering transistor TB2 may be turned on in response to the forward start signal EVST_F, and the Q node EQ and the gate electrodes of the fifth transistor T5 and the sixth transistor T6 may be connected electrically. In addition, the clock transistor Tclk may be turned on to electrically connect the gate electrode of the pump transistor Tpump with an input terminal of the second clock signal ECLK2.

While the forward start signal EVST_F at the turn-on level is applied, the first clock signal ECLK1 and the second clock signal ECLK2 may be alternately applied at the turn-on level (i.e., low level).

First, when the first clock signal ECLK1 is applied at the turn-on level, the first transistor T1 may be turned on to transmit the forward start signal EVST_F to the Q node EQ, and the voltage at the Q node EQ may be set to the low level. The first pull-up transistor Tup1 and the second pull-up transistor Tup2 may be turned on in response to the voltage at the Q node EQ at the low level, and the second low-potential driving voltage EVEL2 and the first low-potential driving voltage EVEL1 may be output to the emission signal EM and the carry signal CR, respectively.

When the emission signal EM at the low level is output, the voltage level of the Q node EQ may be further reduced by the boot capacitor Cboot. In other words, the voltage at the Q node EQ may be reduced to a level sufficient to turn on the pull-up transistors Tup1 and Tup2 through the boot capacitor Cboot.

While the voltage at the Q node EQ is set to the low level, the sixth transistor T6 may be turned on to transmit the first high-potential driving voltage EVEH1 to the QB node EQB, and the voltage at the QB node EQB may be set to the high level. In addition, the fifth transistor T5 may be turned on to transmit the first high-potential driving voltage EVEH1 to the gate electrode of the third transistor T3, and the third transistor T3 may be turned off, thereby stably maintaining the voltage at the QB node EQB at the high level.

Meanwhile, while the emission signal EM at the turn-on level is output, the feedback transistor Tfeed may be turned on to transmit the first low-potential driving voltage EVEL1 to the gate electrode of the pump transistor Tpump. Therefore, while the emission signal EM at the turn-on level is output, the pump transistor Tpump may maintain the turn-on state, and the pump capacitor Cpump may be electrically connected to the Q node EQ for coupling.

While the forward start signal EVST_F at the turn-on level is applied, the clock transistor Tclk is turned on, and thus the second clock signal ECLK2 may be applied to the pump capacitor Cpump. While the second clock signal ECLK2 repeats the high level and the low level, the voltage at the Q node EQ may be changed by the coupled pump capacitor Cpump.

Specifically, when the second clock signal ECLK2 is changed from the high level to the low level, a current may flow from the Q node EQ to the pump capacitor Cpump through the pump transistor Tpump to reduce the voltage level of the Q node EQ. On the other hand, when the second clock signal ECLK2 is changed from the low level to the high level, the voltage at the Q node EQ is not changed by the diode-connected pump transistor Tpump.

As described above, by the pump controller 43, while the emission signal EM is output at the turn-on level, the Q node EQ may be gradually reduced in response to the second clock signal ECLK2 repeating the high level and the low level. For example, the voltage at the Q node EQ may be reduced by a first level Δ1 for each cycle of the second clock signal ECLK2. Therefore, a difference between the voltage at the Q node EQ and the voltages for turning on the pull-up transistors Tup1 and Tup2 may gradually increase. Therefore, while the emission signal EM is output at the turn-on level, the pull-up transistors Tup1 and Tup2 may stably maintain the turn-on state, and the emission signal EM at the turn-on level may be continuously output.

Figure 6:
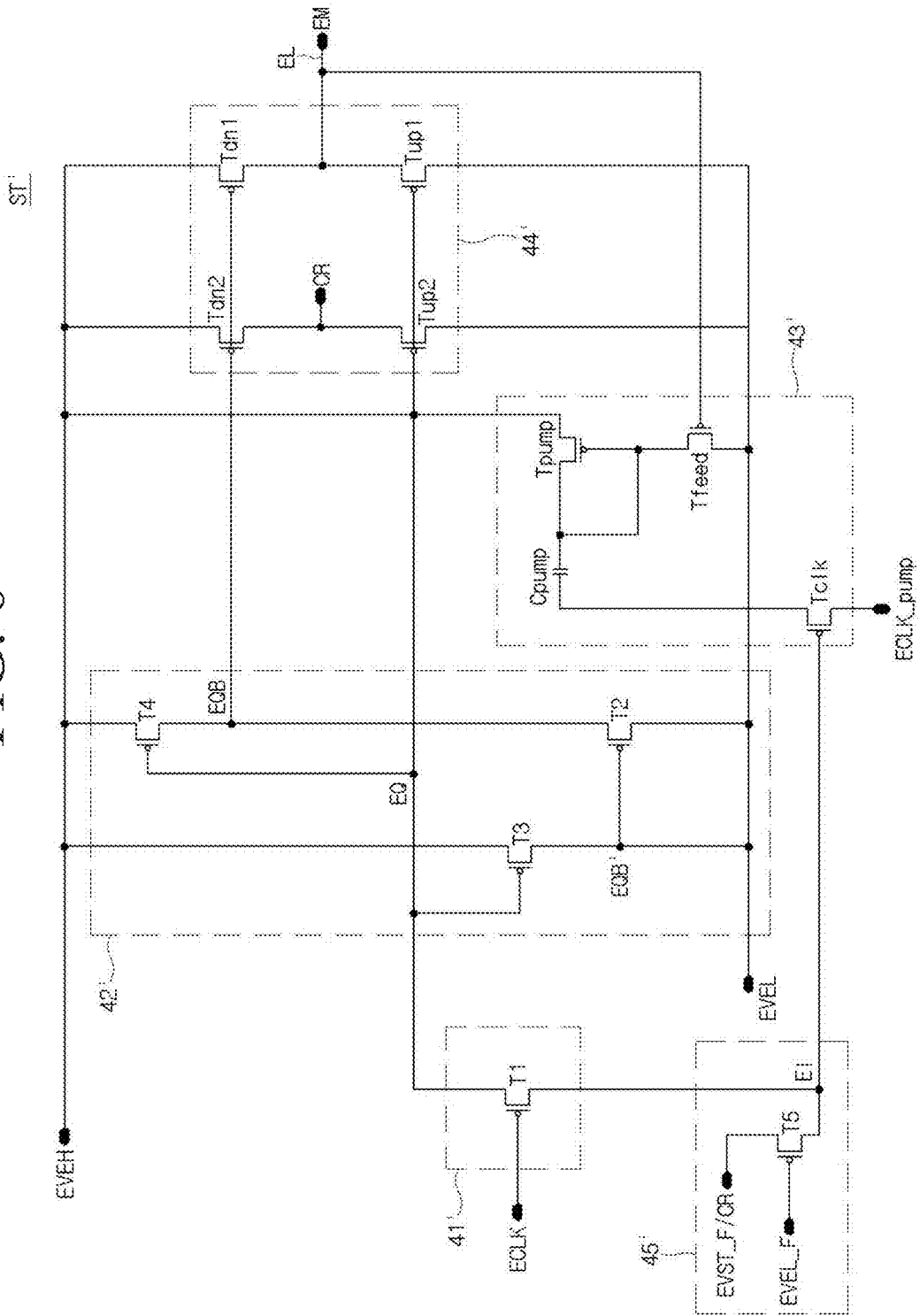
FIG. 6 is a circuit diagram specifically the stage circuit of FIG. 3 according to another embodiment.

FIG. 6 is a circuit diagram specifically showing the stage circuit of FIG. 3 according to another embodiment.

Referring to FIG. 6, a stage circuit ST' may include a Q node controller 41', a QB node controller 42', a pump controller 43', and an output buffer 44'. In addition, the stage circuit ST' may further include a signal input unit 45'.

The Q node controller 41' may include the first transistor T1.

The first transistor T1 may be electrically connected between the input node EI of the start signal EVST or the carry signal CR output from the previous stage and the Q node EQ. The gate electrode of the first transistor T1 is configured to receive the clock signal ECLK. The first transistor T1 may be turned on according to the clock signal ECLK to apply the start signal EVST or the carry signal CR input through the signal input unit 45' to the Q node EQ.

The QB node controller 42' may include the second transistor T2, the third transistor T3, and the fourth transistor T4.

The second transistor T2 may be electrically connected between the input terminal of the first low-potential driving voltage EVEL and the QB node EQB. The gate electrode of the second transistor T2 may be connected to a QB' node EQB'. The second transistor T2 may be turned on when a voltage at the QB' node EQB' is set to the turn-on level to apply the low-potential driving voltage EVEL to the QB node EQB.

The third transistor T3 may be electrically connected between the QB' node EQB' and an input terminal of the high-potential driving voltage EVEH. The gate electrode of the third transistor T3 is connected to the Q node EQ. The third transistor T3 may be turned on when the voltage at the Q node EQ is set to the turn-on level to apply the high-potential driving voltage EVEH to the QB' node EQB'. When the third transistor T3 is turned on and the voltage at the QB' node EQB' is set to the high-potential driving voltage EVEH, the second transistor T2 is turned off not to apply the low-potential driving voltage EVEL to the QB node EQB.

The fourth transistor T4 may be electrically connected between the input terminal of the high-potential driving voltage EVEH and the QB node EQB. The gate electrode of the fourth transistor T4 may be electrically connected to the Q node EQ. The fourth transistor T4 may be turned on when the voltage at the Q node EQ is set to the turn-on level to apply the high-potential driving voltage EVEH to the QB node EQB. When the Q node EQ is set to the turn-on level voltage, the QB node EQB may be set to the turn-off level voltage through the fourth transistor T4.

The pump controller 43' may include the clock transistor Tclk, the pump capacitor Cpump, the feedback transistor Tfeed, and the pump transistor Tpump.

The clock transistor Tclk may be electrically connected between the pump capacitor Cpump and an input terminal of a pump clock signal ECLK_pump. The gate electrode of the clock transistor Tclk is configured to receive the start signal EVST or the carry signal CR. The clock transistor Tclk may be turned on according to the start signal EVST or the carry signal CR to apply a voltage corresponding to the pump clock signal ECLK_pump to the pump capacitor Cpump.

The pump clock signal ECLK_pump may be a pulse signal which has the same waveform as the clock signal ECLK and has an opposite phase. In one embodiment, the pump clock signal ECLK_pump may control the voltage level of the pulse or the size of a pulse delay to control the voltage at the Q node EQ.

The pump capacitor Cpump may be electrically connected between the clock transistor Tclk and the pump transistor Tpump. The pump capacitor Cpump may store the voltage applied through the clock transistor Tclk.

The feedback transistor Tfeed may be electrically connected between the low-potential driving voltage EVEL and the gate electrode of the pump transistor Tpump. The gate electrode of the feedback transistor Tfeed is connected to the emission line EL. The feedback transistor Tfeed is turned on while the emission signal EM at the turn-on level is output to the emission line EL to apply the low-potential driving voltage EVEL to the gate electrode of the pump transistor Tpump. Therefore, when the feedback transistor Tfeed is turned on, the pump transistor Tpump may be turned on in response to the low-potential driving voltage EVEL.

The pump transistor Tpump is diode-connected between the pump capacitor Cpump and the Q node EQ. The gate electrode of the pump transistor Tpump is connected to the feedback transistor Tfeed. The pump transistor Tpump is turned on when the low-potential driving voltage EVEL is applied to the gate electrode through the feedback transistor Tfeed to electrically connect the pump capacitor Cpump with the Q node EQ.

The output buffer 44' may include one or more pull-up transistors Tup1 and Tup2 and one or more pull-down transistors Tdn1 and Tdn2. For example, the output buffer 44' may include a pair of pull-up and pull-down transistors Tup1 and Tdn1 for outputting the emission signal EM and a pair of pull-down transistors Tup2 and Tdn2 for outputting the carry signal CR.

The first pull-up transistor Tup1 may be electrically connected between the low-potential driving voltage EVEL and the emission line EL. The gate electrode of the first pull-up transistor Tup1 is connected to the Q node EQ. When the voltage at the Q node EQ is set to the turn-on level, the first pull-up transistor Tup1 may output the low-potential driving voltage EVEL as the emission signal EM to the emission line EL.

The first pull-up transistor Tdn1 may be electrically connected between the high-potential driving voltage EVEH and the emission line EL. The gate electrode of the second pull-up transistor Tup2 is connected to the QB node EQB. When the voltage at the QB node EQB is set to the turn-on level, the second pull-up transistor Tup2 may output the high-potential driving voltage EVEH as the emission signal EM to the emission line EL.

The second pull-up transistor Tup2 may be electrically connected between the low-potential driving voltage EVEL and the output terminal of the carry signal CR. The gate electrode of the second pull-up transistor Tup2 is connected to the Q node EQ. When the voltage at the Q node EQ is set to the turn-on level, the second pull-up transistor Tup2 may output the low-potential driving voltage EVEL as the carry signal CR.

The second pull-up transistor Tdn2 may be electrically connected between the high-potential driving voltage EVEH and the output terminal of the carry signal CR. The gate electrode of the second pull-up transistor Tup2 is connected to the QB node EQB. When the voltage at the QB node EQB is set to the turn-on level, the second pull-up transistor Tup2 may output the high-potential driving voltage EVEH as the carry signal CR.

The signal input unit 45' may include the fifth transistor T5.

One electrode of the fifth transistor T5 is connected to the input terminal of the forward start signal EVST_F or the input terminal of the carry signal CR of the previous stage circuit ST. The other electrode of the fifth transistor T5 is connected to the input node EL. The gate electrode of the fifth transistor T5 may be connected to the forward low-potential driving voltage EVEL_F. The fifth transistor T5 may be turned on by the forward low-potential driving voltage EVEL_F applied when the emission driver 40 is in the forward mode to apply the forward start signal EVST_F to the input node EI.

Figure 7:
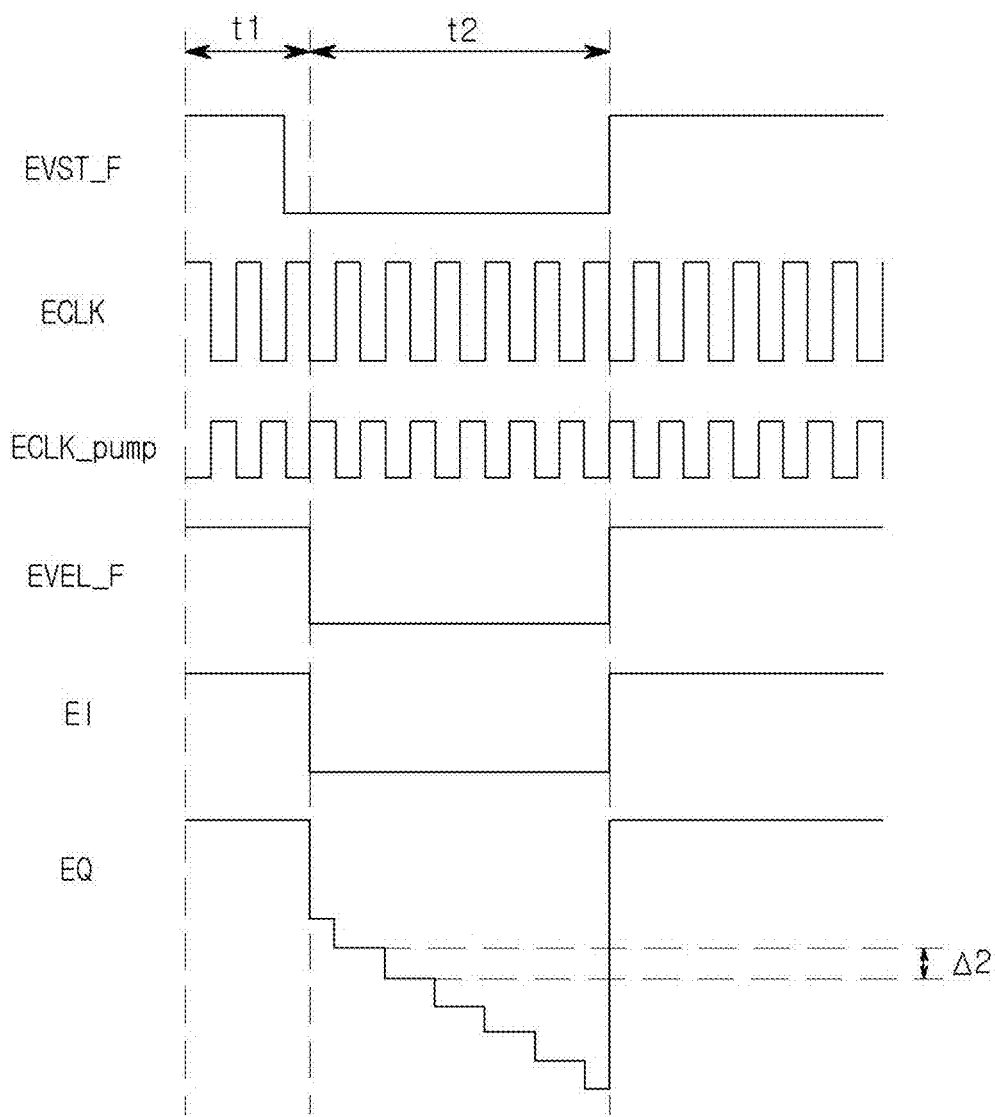
FIG. 7 is a timing diagram of the method of driving the stage circuit of FIG. 6 according to one embodiment.

FIG. 7 is a timing diagram showing the method of driving the stage circuit of FIG. 6 according to one embodiment.

Referring to FIGS. 6 and 7 together, the forward start signal EVST_F may be applied at the turn-off level (i.e., high level) for the first period t1 in one frame. In addition, while the forward start signal EVST_F at the turn-off level is applied, the first clock signal ECLK1 may be applied at the turn-on level (i.e., low level).

When the first transistor T1 is turned on in response to the first clock signal ECLK1, the forward start signal EVST_F may be transmitted to the Q node EQ, and the voltage at the Q node EQ may be set to a high level.

In response to the voltage at the Q node EQ, the third transistor T3 is turned off, and the second transistor T2 is turned on by the low-potential driving voltage EVEL applied to the gate electrode of the second transistor T2 to apply the low-potential driving voltage EVEL to the QB node EQB. Therefore, the voltage at the QB node EQB may be set to the low level. The first pull-down transistor Tdn1 and the second pull-down transistor Tdn2 may be turned on in response to the voltage at the QB node EQB at the low level, and the high-potential driving voltage EVEH may be output to the emission signal EM and the carry signal CR.

Thereafter, the forward start signal EVST_F may be applied at the turn-on level (i.e., low level) during time t2. When the forward low-potential driving voltage EVEL_F is applied to the gate electrode of the fifth transistor T5 for the second period t2, the fifth transistor T5 may be turned on to apply the forward start signal EVST_F to the Q node controller 41', the QB node controller 42', and the pump controller 43'.

While the forward start signal EVST_F at the turn-on level is applied, the clock signal ECLK and the pump clock signal ECLK pump may be alternately applied at the turn-on level (i.e., low level).

First, when the clock signal ECLK is applied at the turn-on level, the first transistor T1 may be turned on to transmit the forward start signal EVST_F to the Q node EQ, and the voltage at the Q node EQ may be set to the low level. The first pull-up transistor Tup1 and the second pull-up transistor Tup2 may be turned on in response to the voltage at the Q node EQ at the low level, and the low-potential driving voltage EVEL may be output to the emission signal EM and the carry signal CR.

While the voltage at the Q node EQ is set to the low level, the fourth transistor T4 may be turned on to transmit the high-potential driving voltage EVEH to the QB node EQB, and the voltage at the QB node EQB may be set to the high level. In addition, the third transistor T3 may be turned on to transmit the high-potential driving voltage EVEH to the gate electrode of the second transistor T2, and the second transistor T2 may be turned off, thereby stably maintaining the voltage at the QB node EQB at the high level.

Meanwhile, while the emission signal EM at the turn-on level is output, the feedback transistor Tfeed may be turned on to transmit the low-potential driving voltage EVEL to the gate electrode of the pump transistor Tpump. Therefore, while the emission signal EM at the turn-on level is output, the pump transistor Tpump may maintain the turn-on state, and the pump capacitor Cpump may be electrically connected to the Q node EQ for coupling.

While the forward start signal EVST_F at the turn-on level is applied, the clock transistor Tclk is turned on, and thus the pump clock signal ECLK_pump may be applied to the pump capacitor Cpump. While the pump clock signal ECLK_pump repeats the high level and the low level, the voltage at the Q node EQ may be changed by the coupled pump capacitor Cpump.

Specifically, when the pump clock signal ECLK_pump is changed from the high level to the low level, a current may flow from the Q node EQ to the pump capacitor Cpump through the pump transistor Tpump to reduce the voltage level of the Q node EQ. On the other hand, when the pump clock signal ECLK_pump is changed from the low level to the high level, the voltage at the Q node EQ is not changed by the diode-connected pump transistor Tpump.

As described above, while the emission signal EM is output at the turn-on level by the pump controller 43', the Q node EQ may be gradually reduced in response to the pump clock signal ECLK_pump repeating the high level and the low level. Therefore, a difference between the voltage at the Q node EQ and the voltages for turning on the pull-up transistors Tup1 and Tup2 may gradually increase. Therefore, while the emission signal EM is output at the turn-off level, the pull-up transistors Tup1 and Tup2 may stably maintain the turn-on state, and the emission signal EM at the turn-on level may be continuously output.

A change in voltage at the Q node EQ may be controlled according to the voltage applied to the pump capacitor Cpump by the pump controller 43'. The voltage applied to the pump capacitor Cpump may be controlled according to the amount of current which may flow through the clock transistor Tclk, and the amount of current may be controlled according to the gate-source voltage of the clock transistor Tclk.

When the voltage of the gate electrode of the clock transistor Tclk is fixed, the gate-source voltage is determined according to the voltage level of the pump clock signal ECLK_pump. Therefore, as the voltage level of the pulse of the pump clock signal ECLK_pump is adjusted, the degree of voltage drop of the Q node EQ may be adjusted.

In the shown embodiment, the pulse voltage level of the pump clock signal ECLK_pump is set relatively low. For example, the pulse voltage level of the pump clock signal ECLK_pump may be set lower than the pulse voltage level of the clock signal ECLK. Then, since the gate-source voltage of the clock transistor Tclk is relatively decreased, the amount of current flowing through the pump capacitor Cpump is decreased. In other words, since the amount of current flowing from the Q node EQ to the pump capacitor Cpump is decreased, the voltage at the Q node EQ is relatively less decreased.

In the embodiment shown in FIG. 7, the voltage at the Q node EQ is decreased by a second level Δ2 for each cycle of the pump clock signal ECLKpump. Here, the second level Δ2 may be smaller than the first level Δ1 described with reference to FIG. 5.

When the voltage at the Q node EQ gradually decreases, a high gate-source voltage may be applied to the third transistor T3 and the fourth transistor T4 of which gate electrodes are connected to the Q node EQ, thereby increasing an element stress. As in the embodiment of FIG. 7, when a falling width of the voltage at the Q node EQ is adjusted through control of the pump clock signal ECLK_pump, it is possible to prevent the high gate-source voltage from being applied to the third transistor T3 and the fourth transistor T4. As a result, according to the embodiment, it is possible to reduce the element stress, thereby improving the lifetime of the element and improving the stability and reliability of the stage circuit ST'.

Figure 8:
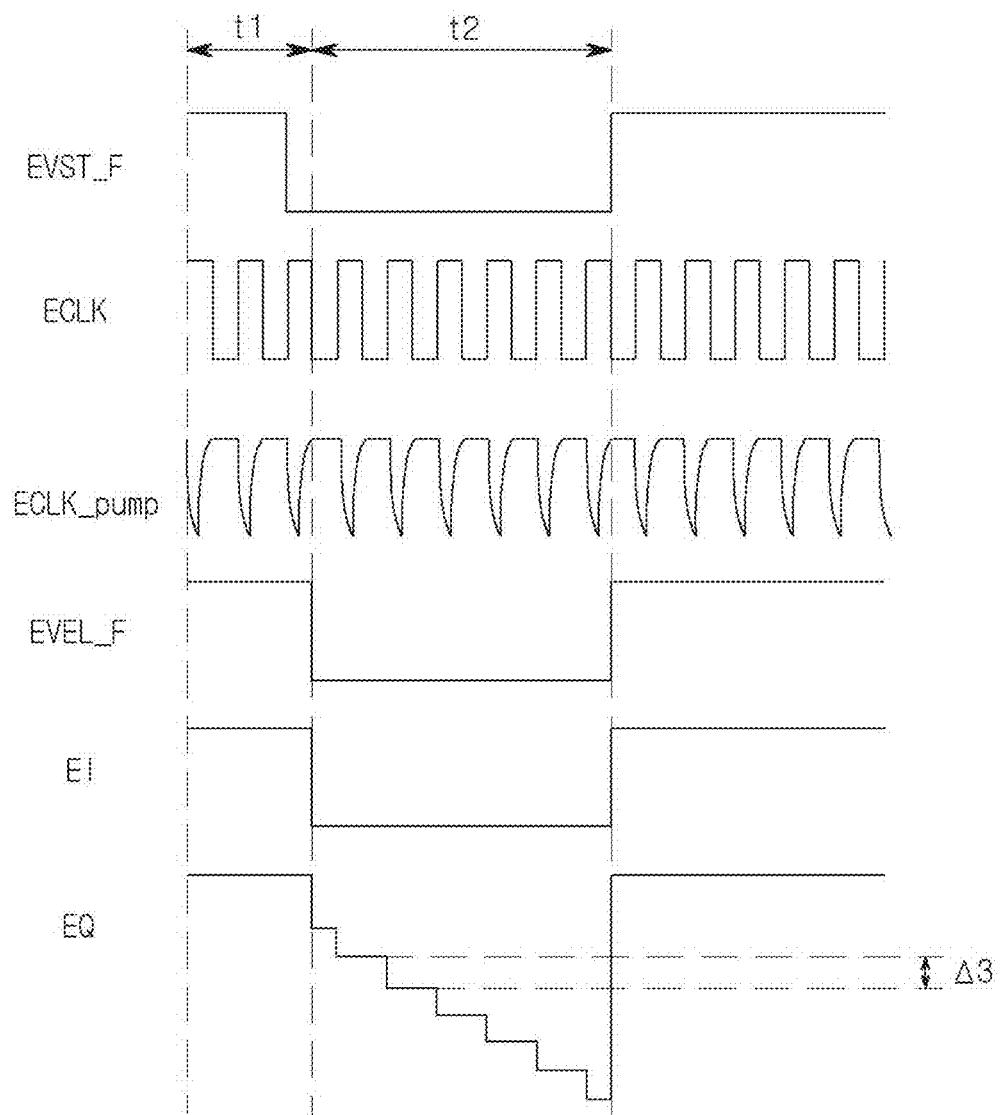
FIG. 8 is a timing diagram of the method of driving the stage circuit of FIG. 6 according to another embodiment.

FIG. 8 is a timing diagram showing the method of driving the stage circuit of FIG. 6 according to another embodiment.

Compared to the embodiment of FIG. 7, in the embodiment of FIG. 8, the size of the pulse delay of the pump clock signal ECLK_pump is adjusted. Specifically, a pulse generation time of the pump clock signal ECLK_pump may be delayed by increasing a length of a predetermined rising time. For example, the pump clock signal ECLK_pump may be controlled to have a longer rising time than the clock signal ECLK. The adjustment for the pulse delay can be implemented by adding a resistor to an input line or an input pin to which the pump clock signal ECLK_pump is applied.

When the pulse of the pump clock signal ECLK_pump is delayed, the time for which the turn-on level is maintained is relatively short, and thus the voltage at the Q node EQ is relatively less decreased. In the embodiment shown in FIG. 8, the voltage at the Q node EQ is decreased by a third level Δ3 for each cycle of the pump clock signal ECLK_pump. Here, the third level Δ3 may be smaller than the first level Δ1 described with reference to FIG. 5.

When the voltage at the Q node EQ gradually decreases, a high gate-source voltage may be applied to the third transistor T3 and the fourth transistor T4 of which gate electrodes are connected to the Q node EQ, thereby increasing an element stress. As in the embodiment of FIG. 8, when a falling width of the voltage at the Q node EQ is adjusted through control of the pump clock signal ECLK_pump, it is possible to prevent the high gate-source voltage from being applied to the third transistor T3 and the fourth transistor T4. As a result, according to the embodiment, it is possible to reduce the element stress, thereby improving the lifetime of the element and improving the stability and reliability of the stage circuit ST'.

Figure 9:
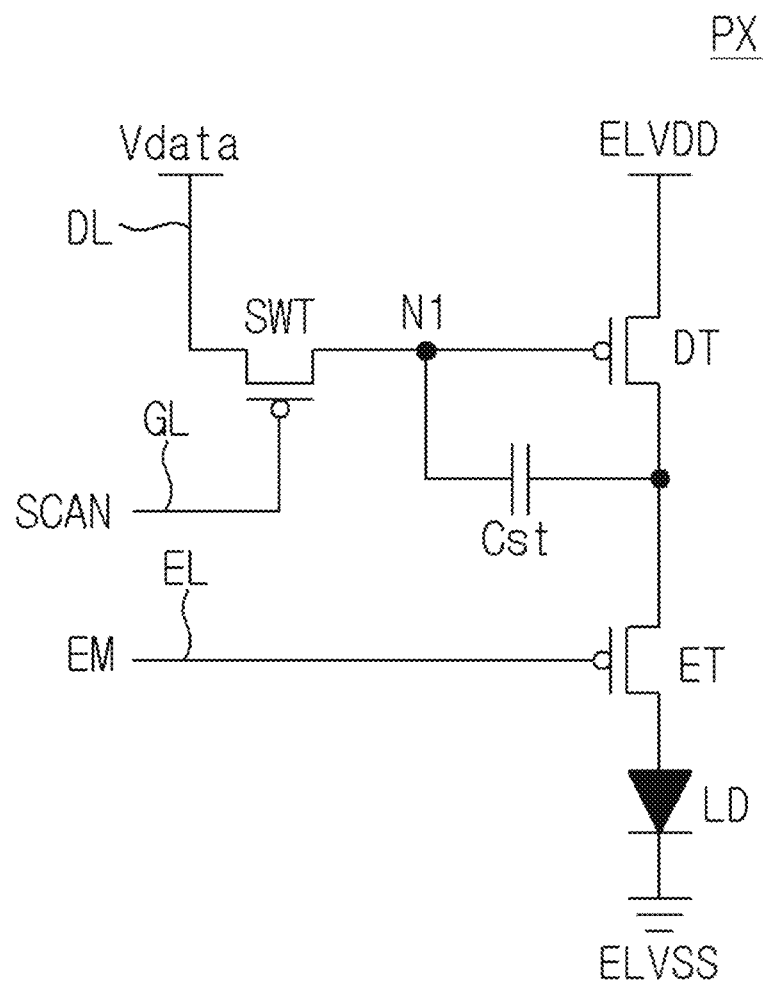
FIG. 9 is a circuit diagram showing a pixel according to one embodiment.

FIG. 9 is a circuit diagram showing a pixel according to one embodiment.

Referring to FIG. 9, the pixel PX may include a driving transistor DT, an light emitting element LD connected to the driving transistor DT, and a control circuit CC for controlling the amount of driving current to be applied to the light emitting element LD through the driving transistor DT. For example, the control circuit CC may include a switching transistor SWT, an emission control transistor ET, and a storage capacitor Cst.

A first electrode of the driving transistor DT is connected to the high-potential driving voltage ELVDD, and a second electrode thereof is connected to an anode of the light emitting element LD. The gate electrode of the driving transistor DT is connected to a first node N1. The driving transistor DT may be turned on according to a voltage applied to the first node N1 to control the amount of driving current flowing from the high-potential driving voltage ELVDD to the light emitting element LD.

The switching transistor SWT is connected between the first node N1 and the data line DL. A gate electrode of the switching transistor SWT is connected to the gate line GL. The switching transistor SWT may be turned on in response to the gate signal SCAN applied to the gate line GL. When the switching transistor SWT is turned on, the data voltage Vdata applied to the data line DL may be applied to the first node N1.

The storage capacitor Cst is connected between the first node N1 and the anode of the light emitting element LD. The storage capacitor Cst may store a voltage corresponding to a voltage difference between the first node N1 and the anode of the light emitting element LD.

The emission control transistor ET is connected between the driving transistor DT and the light emitting element LD. A gate electrode of the emission control transistor ET is connected to the emission line EL. The emission control transistor ET may be turned on in response to the emission signal EM applied to the emission line EL. When the emission control transistor ET is turned on, the driving transistor DT and the light emitting element LD may be connected to form a current path flowing from the high-potential driving voltage ELVDD to the light emitting element LD.

The light emitting element LD may have the anode connected to the driving transistor DT via the emission control transistor ET and a cathode connected to the low-potential driving voltage ELVSS. When the driving transistor DT and the emission control transistor ET are turned on, a current path may be formed between the high-potential driving voltage ELVDD and the low-potential driving voltage ELVSS to allow the driving current to flow to the light emitting element LD. The light emitting element LD may emit light with brightness corresponding to the amount of driving current applied.

The display device 1 (see FIG. 1) according to one embodiment may be a display including a backlight unit such as an LCD device and may be a self-luminous display device, such as an OLED display device, a quantum dot display device, and a micro-LED display device.

When the display device 1 is the OLED display device, each pixel PX may include an OLED, which emits light by themselves, as the light emitting element. When the display device 1 is the quantum dot display, each pixel PX may include a light emitting element formed of quantum dots, which are semiconductor crystals and emit light by themselves. When the display device 1 is the micro-LED display device, each pixel PX may include micro LEDs, which emit light by themselves and are made of an inorganic material, as a light emitting element. When the display device 1 is a nano LED display device, each pixel PX may include nano LEDs, which emit light by themselves and are made of inorganic material, as the light emitting element.

According to the emission driver and the display including the same according to the embodiments, by improving the reliability of the emission driver, it is possible to stably maintain the level of the emission signal output for an emission period and improve the quality of the image.

In addition, according to the emission driver and the display including the same according to the embodiments, by reducing the number of transistors, it is possible to implement the thin and ultra-small display device.

Although the embodiments of the present invention have been described above with reference to the accompanying drawings, those skilled in the art to which the present invention pertains will be able to understand that the above-described technical configuration of the present invention can be carried out in other specific forms without changing the technical spirit or essential features thereof. Therefore, it should be understood that the above-described embodiments are illustrative and not restrictive in all respects. In addition, the scope of the present invention is described by the claims to be described below rather than the detailed description. In addition, the meaning and scope of the claims and all changed or modified forms derived from the equivalent concept should be construed as being included in the scope of the present invention.

What is claimed is:

1. A display device comprising:
    a display panel including a plurality of pixels; and
    an emission driver including a plurality of stage circuits, the plurality of stage circuits configured to apply emission signals to the plurality of pixels through a plurality of emission lines,
    wherein each of the plurality of stage circuits includes:
        an EQ node controller configured to control a voltage at an EQ node by applying one of a start signal, a carry signal, or a high-potential driving voltage to the EQ node responsive to a first clock signal received by the EQ node controller;

an EQB node controller configured to control a voltage at an EQB node by applying the high-potential driving voltage or a low-potential driving voltage that is less that the high-potential driving voltage to the EQB node responsive to the first clock signal, the EQB node controller comprising:
- a first buffering transistor connected to the EQ node and a gate of a fifth transistor; and
- a second buffering transistor connected to the EQ node and a gate of a sixth transistor;

an output buffer connected to the EQ node and the EQB node, the output buffer configured to output the high-potential driving voltage or the low-potential driving voltage as an emission signal of the stage circuit to a corresponding emission line from the plurality of emission lines responsive to a voltage at the EQ node and a voltage of the EQB node; and a pump controller connected to the EQ node and receiving a second clock signal and the start signal or the carry signal, the pump controller configured to change the voltage at the EQ node a plurality of times according to the second clock signal while the emission signal is output at a turn-on level that turns on one of the plurality of pixels that is connected to the corresponding emission line responsive to the start signal or the carry signal.

2. The display device of claim 1, wherein each of the plurality of stage circuits further includes:
- at least one transistor having a gate electrode that receives the voltage at the EQ node; and
- at least one buffering transistor connected to the EQ node and the gate electrode of the at least one transistor, the at least one buffering transistor configured to transmit the voltage at the EQ node to the gate electrode of the at least one transistor in response to the start signal or the carry signal.

3. The display device of claim 2, wherein the start signal or the carry signal is a pulse signal having a turn-on level and a turn-off level that alternate, the turn-off level different from the turn-on level.

4. The display device of claim 1, wherein each of the plurality of stage circuits further includes:
- at least one transistor having an electrode that is directly connected to an input terminal of the high-potential driving voltage,
- wherein the at least one transistor includes a plurality of sub-transistors that are connected in series.

5. The display device of claim 1, wherein the EQ node controller includes:
- a first transistor connected to the EQ node and an input node at which the start signal or the carry signal is input to the first transistor, the first transistor having a gate electrode that is connected to an input terminal of the first clock signal; and
- a second transistor connected to an input terminal of the high-potential driving voltage and the first transistor at the EQ node, the second transistor having a gate electrode that is connected to the EQB node.

6. The display device of claim 1, wherein the EQB node controller further includes:
- a third transistor connected to an input terminal of the low-potential driving voltage and the EQB node, the third transistor having a gate electrode that is connected to a EQB' node; and
- a fourth transistor connected to the input terminal of the low-potential driving voltage, the EQB' node, and the gate electrode of the third transistor, the fourth transistor having a gate electrode that is connected to an input terminal of the first clock signal,
- wherein the fifth transistor is connected to an input terminal of the high-potential driving voltage, the EQB' node, the gate electrode of the third transistor, and the fourth transistor, the fifth transistor having a gate electrode that receives the voltage at the EQ node,
- wherein the first buffering transistor has a gate electrode connected to an input node at which the start signal or the carry signal is applied to the gate electrode of the first buffering transistor, and
- wherein the first buffering transistor is configured to transmit the voltage of the EQ node to the gate electrode of the fifth transistor responsive to the start signal or the carry signal.

7. The display device of claim 6,
- wherein the sixth transistor is connected to an input terminal of the high-potential driving voltage and the EQB node, the sixth transistor having a gate electrode that receives the voltage at the EQ node
- wherein the second buffering transistor has a gate electrode connected to the input node, and
- wherein the second buffering transistor is configured to transmit the voltage of the EQ node to the gate electrode of the sixth transistor responsive to the start signal or the carry signal.

8. The display device of claim 1, wherein the pump controller includes:
- a pump capacitor;
- a pump transistor connected to the EQB node and a first capacitor electrode of the pump capacitor, the pump transistor having a gate electrode connected to the first capacitor electrode of the pump capacitor;
- a clock transistor connected to a second capacitor electrode of the pump capacitor and an input terminal of the second clock signal, the clock transistor having a gate electrode that is connected an input node at which the start signal or the carry signal is input; and
- a feedback transistor connected to the gate electrode of the pump transistor and an input terminal of the low-potential driving voltage, the feedback transistor having a gate electrode that is connected to the corresponding emission line.

9. The display device of claim 8, wherein the pump controller further includes:
- a reset transistor connected to an input terminal of the high-potential driving voltage, the gate electrode of the pump transistor, and the first capacitor electrode of the pump capacitor, the reset transistor having a gate electrode that is connected to the EQB node.

10. The display device of claim 1, wherein the output buffer includes:
- a first pull-up transistor connected to an input terminal of the low-potential driving voltage and the corresponding emission line, the first pull-up transistor having a gate electrode that is connected to the EQ node; and
- a first pull-down transistor connected to an input terminal of the high-potential driving voltage and the corresponding emission line, the first pull-down transistor having a gate electrode that is connected to the EQB node.

11. The display device of claim 10, wherein the output buffer further includes:

a second pull-up transistor connected to the input terminal of the low-potential driving voltage and an output terminal of the carry signal, the second pull-up transistor having a gate electrode connected to the EQ node; and a second pull-down transistor connected to the input terminal of the high-potential driving voltage and the output terminal of the carry signal, the second pull-down transistor having a gate electrode connected to the EQB node.

12. The display device of claim 1, wherein each of the plurality of stage circuits further includes:
a signal input circuit configured to apply the start signal or the carry signal to the EQ node controller, the EQB node controller, and the pump controller.

13. The display device of claim 1, wherein each of the plurality of stage circuits further includes:
a reset circuit that is connected to the EQ node, the reset circuit configured to initialize the voltage at the EQ node to the high-potential driving voltage responsive to a reset signal.

14. The display device of claim 1, wherein the pump controller includes:
a pump capacitor;
a pump transistor connected to the EQB node and a first capacitor electrode of the pump capacitor, the pump transistor having a gate electrode connected to the first capacitor electrode of the pump capacitor;
a clock transistor connected between a second capacitor electrode of the pump capacitor and an input terminal of a pump clock signal, the clock transistor having a gate electrode connected an input node at which the start signal or the carry signal is input; and
a feedback transistor connected to the gate electrode of the pump transistor and an input terminal of the low-potential driving voltage, the feedback transistor having a gate electrode connected to the corresponding emission line.

15. The display device of claim 14, wherein a pulse voltage level of the pump clock signal is set to be less than a pulse voltage level of the first clock signal.

16. The display device of claim 14, wherein the pump clock signal is a pulse signal with a predetermined rising time.

17. An emission driver comprising:
a plurality of stage circuits that are configured to apply emission signals to a plurality of pixels through a plurality of emission lines, wherein each of the plurality of stage circuits includes:
an EQ node controller configured to control a voltage at a EQ node by applying one of a start signal, a carry signal, or a high-potential driving voltage to the EQ node responsive to a first clock signal;
an EQB node controller configured to control a voltage at an EQB node by applying the high-potential driving voltage or a low-potential driving voltage that is less that the high-potential driving voltage to the EQB node responsive to the first clock signal, the EQB node controller including a second buffering transistor connected to the EQ node and a gate electrode of a sixth transistor that is directly connected to an input terminal of the high-potential driving voltage and receives a voltage of the EQ node at the gate electrode of the sixth transistor through the second buffering transistor that is connected to the gate electrode of the sixth transistor and the EQ node, and a first buffering transistor connected to the EQ node and a gate of a fifth transistor; and an output buffer connected to the EQ node and the EQB node, the output buffer configured to output the high-potential driving voltage or the low-potential driving voltage as an emission signal of the stage circuit to a corresponding emission line from the plurality of emission lines responsive to a voltage at the EQ node and a voltage at the EQB node.

18. The emission driver of claim 17, wherein the second buffering transistor includes a gate electrode that receives the start signal or the carry signal that is a pulse signal including a turn-on level and a turn-off level that alternate, the turn-off level different from the turn-on level.

19. The emission driver of claim 17, wherein the sixth transistor that is directly connected to the input terminal of the high-potential driving voltage comprises a plurality of transistors that are serially connected,
wherein gate electrodes of the plurality of transistors are connected to each other.

20. The emission driver of claim 17, further comprising:
a pump controller configured to change the voltage at the EQ node according to a second clock signal in response to the start signal or the carry signal while the emission signal is output at a turn-on level.

21. The emission driver of claim 20, wherein the pump controller includes:
a pump capacitor;
a pump transistor connected to the EQB node and a first capacitor electrode of the pump capacitor, the pump transistor having a gate electrode connected to the first capacitor electrode of the pump capacitor;
a clock transistor connected to a second capacitor electrode of the pump capacitor and an input terminal of the second clock signal, the clock transistor having a gate electrode that is connected an input node at which the start signal or the carry signal is input; and
a feedback transistor connected to the gate electrode of the pump transistor and an input terminal of the low-potential driving voltage, the feedback transistor having a gate electrode that is connected to the corresponding emission line.

22. The emission driver of claim 21, wherein a pulse voltage level of the second clock signal is less than a pulse voltage level of the first clock signal.

23. The emission driver of claim 21, wherein the second clock signal is a pulse signal with a predetermined rising time.

24. The emission driver of claim 21, wherein the first clock signal and the second clock signal have a same pulse voltage level with different phases.

* * * * *